United States Patent
Ronemus

[11] 3,859,847
[45] Jan. 14, 1975

[54] VIBRATION MONITORING DEVICE USING ACCELEROMETER TO MEASURE DISPLACEMENT

[75] Inventor: David C. Ronemus, Hatfield, Pa.

[73] Assignee: Westinghouse Electric Corporation, Pittsburgh, Pa.

[22] Filed: Sept. 6, 1972

[21] Appl. No.: 286,623

[52] U.S. Cl. ..................................... 73/70, 73/71.2
[51] Int. Cl. ............................................. G01h 1/00
[58] Field of Search ............... 73/70, 71, 71.1, 71.2, 73/71.4; 33/147 N, 174 E, 174 Q

[56] References Cited
UNITED STATES PATENTS

| | | | |
|---|---|---|---|
| 2,363,373 | 11/1944 | Werner | 73/71.4 |
| 2,764,019 | 9/1956 | Lindholm et al. | 73/71.2 |
| 2,913,829 | 11/1959 | Arlin | 33/147 N |
| 3,234,655 | 2/1966 | Skeels et al. | 73/517 R X |
| 3,468,034 | 9/1969 | Blinder | 33/174 Q |

FOREIGN PATENTS OR APPLICATIONS

| | | | |
|---|---|---|---|
| 118,989 | 1/1958 | U.S.S.R. | 33/174 Q |

Primary Examiner—James J. Gill
Attorney, Agent, or Firm—M. J. Moran

[57] ABSTRACT

The vibration of a rotating shaft is measured with a unitary shaft rider biased against the circumference of the shaft with a coil spring. The shaft rider is relatively light weight for true tracking at high frequencies of vibration and the accelerometer used to measure the absolute value of the vibration is disposed upon the top of the shaft rider close to the rotating shaft. The acceleration signal from the accelerometer is provided to an electronics module at the top or outside portion of a bearing cap in which the rider, spring and accelerometer are disposed. This is adapted for measuring frequency of vibrations over a wide range and for measuring low frequency vibration. The rider has a very low propensity for tangential movement, which if present could give a false indication of vibration.

11 Claims, 1 Drawing Figure

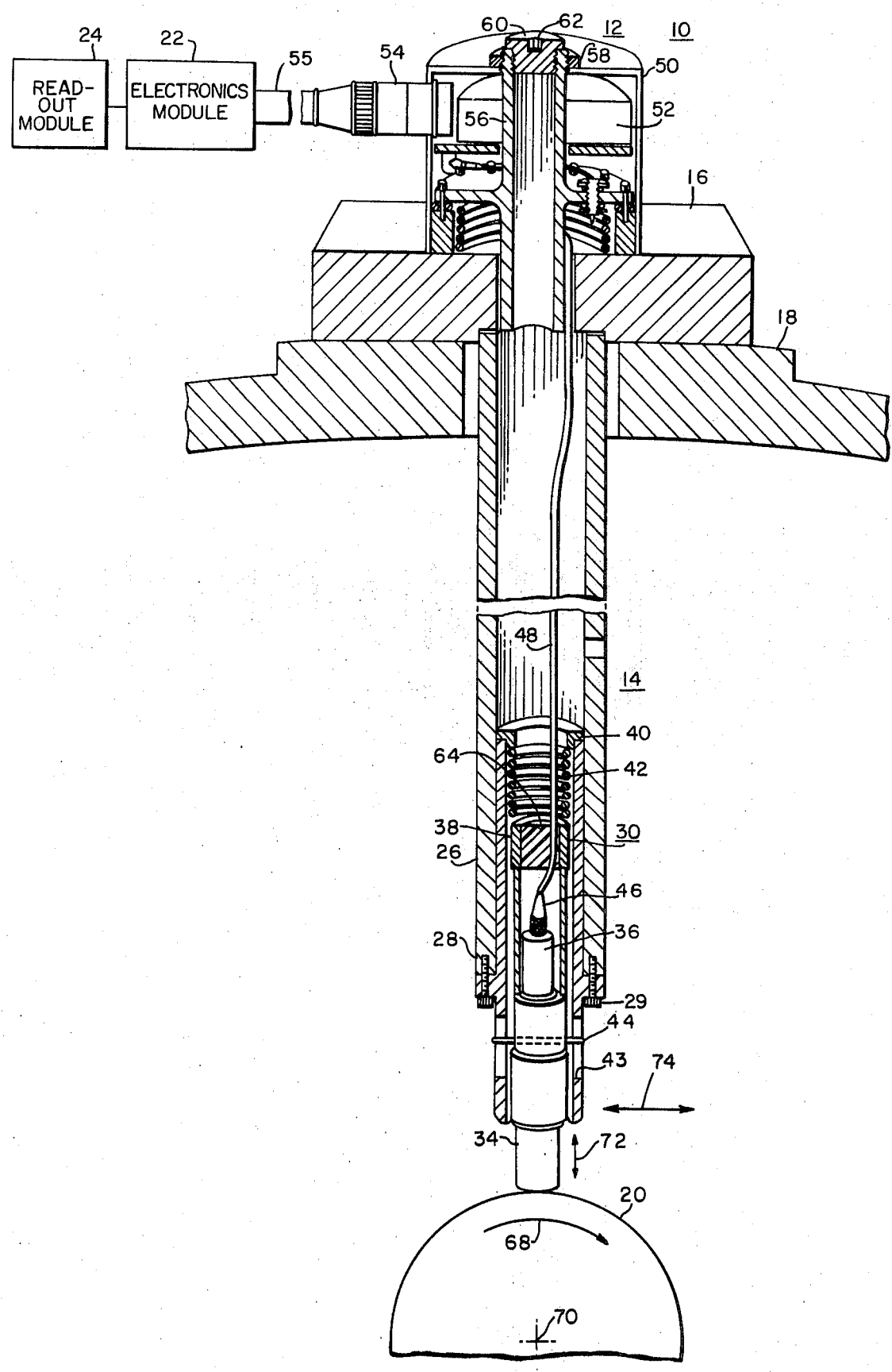

VIBRATION MONITORING DEVICE USING ACCELEROMETER TO MEASURE DISPLACEMENT

BACKGROUND OF THE INVENTION

This invention relates to vibration monitoring devices and in particular to accelerometer vibration monitoring devices for measuring the vibration of a rotating shaft.

Prior art vibration monitoring devices have included displacement transducers or velocity transducers mounted at the end of the long rider, the other end of which abuts the moving periphery of a rotating shaft. The displacement transducer measures displacements in the former case by measuring the amount of movement of the upper end of the shaft rider relative to a fixed reference housing. For example, the relatively fixed reference housing may have disposed therein the primary and secondary windings of a transformer, and the shaft rider may have disposed on the end thereof, a magnetic core which moves relative to the previously described primary and secondary windings to change the magnetic flux paths therebetween and thereby change the amount of electrical current produced or induced in the secondary winding. The primary winding of the previously described transformer is excited at constant voltage and frequency. A velocity transformer performs in relatively the same manner except it requires integration of the output signal to give displacement. In either instance, however, the relatively fixed portion of the transducer is disposed on some part of the structure in which the rotating shaft moves. This machine or device itself vibrates contributing to the overall vibration signal, so that the electrical current or output signal, as the case may be, from the transducer is dependent upon the amount of vibration in the rotating shaft and thus in the shaft rider minus the amount of vibration in the frame or base thus not giving a true indication of the total vibration of the shaft alone. To compensate for this relative vibration transducers, that is, the type of transducer previously described which may either be of a displacement or velocity type are seismically disposed on the frame or bearing pedestal to damp out vibrations which may come from the frame or pedestal and to consequently give a relatively true indication of the vibration coming from the rotating shaft. However, relatively weak springs which are interposed between the frame portion of the transducer and the pedestal or base of the rotating machine or device for the purpose of seismic mounting are affected by temperature, the mounting angle of the pick up or transducer, as well as spring sag and shaft rider wear. In addition, it is usually required that the seismic mounting springs have a natural frequency of 5 hertz or less to provide effective isolation. However, if such is the case, a 5 hertz vibration signal in the rotating shaft would be difficult to measure as the seismic mounting springs would oscillate forcefully at that frequency. This has the effect of raising the lower limits of measurement for these types of displacement transducers. Other prior art transducers have been developed to solve some of the problems associated with the previously described types of transducers but often in so doing other problems are created which are in some instances as critical as the ones that have been solved. For example, accelerometers have been used to measure the vibration of a rotating shaft by placing the accelerometer directly on the pedestal or frame or bearing cap in which the rotating shaft moves. The moving part of the accelerometer is affixed or secured to a relatively long and heavy shaft follower which penetrates the bearing pedestal to the moving surface of the rotating shaft. At the surface of the rotating shaft, a brush follower rides against the rotating shaft on one end and at its other end is attached to the shaft rider. The shaft is usually relatively heavy because of its length as most bearing pedestals for high speed or heavy rotating shafts have as much as 20 inches between the surface of the rotating shaft and the upper part of the pedestal. The shaft rider, if not forced against the shaft will bounce or move periodically out of contact with the rotating shaft especially if the amount of vibration is high. To overcome this, most prior art shaft riders for accelerometers or absolute vibration measurement transducers are biased against the shaft rider with leaf springs suspended from an inner portion of the previously mentioned bearing cap. The accelerometers of both the prior art and the present invention have a common advantage and that is that by nature they are absolute vibration measuring devices or said in another way they measure displacements in reference to an inertial frame, that is a frame that won't move relative to the vibrating frame described previously. This is so because acceleration which is measured by the accelerometer is independent of the vibration of the fixed portion of the accelerometer. The accelerometer signal is merely integrated twice to form a displacement signal which is a highly accurate indication of the vibration of the shaft upon which the brush and shaft rider are disposed. However, these known types of accelerometer vibration measuring systems have certain inherent disadvantages. One disadvantage is the fact that the use of a leaf spring coupled with the length of the follower allows for tangential movement of the rider along the surface of the rotating shaft. This creates a tendency to give false indications as to the vibration of the shaft alone. Second, because of the necessary length and weight of the shaft, the shaft often cannot follow the G forces present in high speed heavy rotating machinery. Another disadvantage due largely to the fact that the rider is so long and heavy coupled with the spring force necessary to told it in position on the rotating shaft is wear on the measuring surface of the rider. These problems are highlighted in some instances by the fact that the signal from the accelerometer must be integrated twice. The presence of noise thereupon may produce an erroneous signal. One problem with prior art accelerometer displacement transducers is the weight of the relatively long shaft rider which causes shaft rider chattering, due to the fact that the rider is so massive that it can't exactly follow the shaft motion. It would be advantageous therefore to provide an absolute vibration measuring or monitoring device for use with rotating shafts and the like utilizing an accelerometer which is capable of measuring vibration of a shaft with respect to an inertial frame, but which uses a relatively light weight shaft rider not susceptible to excessive wear, capable of following high G forces and capable of moving axially with respect to the axis of the shaft rider without a significant relative tangential or transverse motion.

SUMMARY OF THE INVENTION

According to the invention, a vibration monitoring device capable of measuring absolute vibration by the use of an accelerometer transducer is provided which has two identifiable parts or portions, the first portion being a electronic module which is disposed or mounted on the outer surface of a bearing cap, the second portion being a housing which extends downwardly through the bearing cap to the region of the rotating shaft. Disposed in this housing is a relatively short and light weight shaft rider having disposed upon the top thereof and well within the bearing cap an accelerometer. The accelerometer and relatively light weight shaft rider are biased against the rotating shaft by an axially disposed coil spring. Because of the relatively light weight of the shaft rider and the coil spring, the shaft rider can track forces of up to 50 G's of shaft motion without leaving the surface of the rotating shaft. This is called true tracking. In addition, the coil spring and a guiding mechanism in the housing cause the rider to slide axially relative to the housing with very little tangential motion along the surface of the rotating shaft. The accelerometer is disposed on the upper portion of the shaft rider but below the coil spring. Consequently, it is at the pivot point for any tangential motion which may develop relative to the surface of the shaft rider and the rotating shaft. Since it is at the pivot point, even if the end of the shaft rider may move tangentially with respect to the rotating shaft (transversely with respect to its axis), this motion will not be reflected significantly at the pivot point. In addition, the shaft rider is a unitary shaft rider. That is, the material which forms the follower is the same and formed in the same construction operation as the material which forms the brush which rides against the rotating shaft. This is possible because of the light weight of the shaft rider assembly. If the shaft rider assembly were heavier, it could reasonably be expected that the portion of the shaft rider which moves against the rotating shaft or tracks the rotating shaft would wear quite quickly, necessitating periodic replacements of that portion on the shaft rider. Since the shaft rider is relatively light and there is relatively no tangential movement of the shaft rider and the brush or that portion of the shaft rider which moves against the rotating shaft can be formed from the same unitary piece of material. Since the shaft rider and associated accelerometer are significantly relatively lighter than prior art shaft riders and since the leaf springs are not employed, having been replaced by a coil spring, and since the accelerometer requires no seismic suspension, vibration with a frequency as low as 5 hertz can be measured, where that frequency would be difficult to measure in prior art vibration monitoring devices. This is very important for it is desirable in some instances to know not only the relative vibration of the shaft, as measured at the shaft, but the relative vibration of the base and foundation upon which the shaft is placed. It will be recalled that this was not measured by the relative vibration transducers previously described.

BRIEF DESCRIPTION OF THE DRAWING

For better understanding of the invention reference is made to the following drawing exemplary of the preferred embodiment of the invention in which the single FIGURE is a view of a vibration monitoring device of the type disclosed in the present invention and shown in elevation, partially cut away and partially in section.

DESCRIPTION OF THE PREFERRED EMBODIMENT

Referring now to the single FIGURE of the drawing, a vibration monitoring device 10 of the general type frequently referred to as an absolute vibration monitor is shown. The absolute vibration monitor measures shaft vibration with respect to an inertial frame and employs the use of an accelerometer to measure the vibration. The vibration monitoring device 10 comprises two identifiable portions which may be referred to as the upper portion or frame mounted portion 12 of the vibration monitoring device 10 and the lower portion or measuring assembly 14 of the vibration monitoring device 10. The upper portion 12 has as a part thereof a base member 16 suitable for disposal on a bearing cap 18. Bearing cap 18 is a portion of the bearing (not shown) in which a rotating shaft 20 moves in a rotating manner. The vibration monitoring device 10 produces an electrical output signal which is provided through an electronic signal conditioning module 22 to a readout module 24 where the amount of vibration may be displayed, stored or in some other way utilized. The readout module may include but is not limited to a light beam oscillograph, an electronic cathode ray oscilloscope, photographic material, magnetic tape or a galvanic (D'Arsonval) movement such as found in a standard voltmeter.

The lower portion 14 of the vibration monitoring device 10 includes a generally tubular cylindrical, hollow shaft or housing 26 extending from a portion of the previously described base 16 to the vicinity of the periphery of the rotating shaft 20. The protective outer housing 26 has disposed within a portion thereof an inner housing 28 which may be joined to the outer housing by suitable means, such as the threaded bolts or screws 29. Inner housing 28 which is relatively shorter than the outer housing 26 has disposed therein the vibration monitoring system 30, including as a lower part thereof a unitary shaft rider 34 on the top portion of which is disposed an accelerometer 36 around which is positioned an accelerometer protective housing 38 which communicates at its bottom portion with the unitary shaft rider and at its upper portion with a coil spring 42, the upper portion of which abuts against a retaining ring 40 which is affixed to the previously described inner housing 28. The lower part of the inner housing 28 has disposed therein spaced slots or openings 43 in which roll pens 44 may move substantially in an axial direction with respect to the unitary shaft rider 34 and which prevent substantial twisting movement with respect to the axis of the unitary shaft rider 34. Unitary shaft rider 34 slides along the inner surface of the inner tube 28 carrying the top mounted accelerometer 36 along with it and causing the accelerometer to move with the same acceleration as the shaft rider 34 moves. The shaft rider 34 concurrently causes the previously described accelerometer protective housing 38 to move axially with the shaft rider against the bottom portion of the coil spring 42 compressing the coil spring 42 against the retaining ring 40 as the shaft rider accelerometer 36 and accelerometer protecting housing 38 move upwardly.

A coaxial electrical communicating line 48 capable of carrying electrical signals from the previously described accelerometer 36 is connected thereto by way of connector 46. Coaxial lead line 48 traverses the length of the outer housing 26 between the top of the accelerometer 36 and the region immediately above the base or frame portion 16 of the upper portion 12 of the vibration monitoring device 10. Coaxial cable 48 is coiled inside a protective housing 50 for the upper portion 12. Also within the upper housing 50 and mounted above both the base 16 and the coil of coaxial cable 48 is an electronics module 52 which communicates by way of a connector 54 and an electrical lead 55 with the other and previously described electronics module 22 for the purpose of providing electrical information to the electronic module 22 which may be, in turn, provided to the readout module 24 to give an indication of the amount of vibration in the rotating shaft 20. The upper portion 12 of the vibration monitoring device 10 has a central tube 56 which communicates with the inner part of the cylindrical outer housing 26 of the previously described lower portion 14. The central tube 56 which is cylindrical and hollow has on the top portion and outside thereof threads upon which a retaining ring 58 may be tightened against the upper portion of the housing 50 to retain the housing 50, base 16 and tubular portion 56 together or in assembled relation. On the inner portion of the tubular cylinder 56 are threads into which corresponding threads on a plug 60 may be placed joined so that the plug 60 may substantially clog or protect the opening in the cylindrical tubular portion 56. The plug 60 has a central hole or opening 62 therein into which an auxiliary or testing rod from a vibration monitor may be inserted, which rod will be long enough to traverse a substantial portion of the length of the outer protective tube 26 to engage a groove or recess 64 in the top portion of the accelerometer protective housing 30 to directly measure vibration in an auxiliary fashion or in a testing fashion with respect to the accelerometer vibration monitoring device 10.

OPERATION OF THE MONITORING DEVICE

Rotating shaft 20 may rotate in a clockwise direction 68 about a central axis 70 causing vibration to the tip portion of the shaft rider 34. This is indicated by the arrow 72 which shows oscillatory vibratory motion. This is the vibration at the axis of the shaft rider 34. The shaft rider 34 slides vertically along the inner portion of the inner protective tube 28 and is guided by roll pins 44. Roll pins 44 prevent the shaft rider from twisting on its axis which twisting may cause the cable 48 to break. The relatively tight fit between the shaft rider 34 and the inner portion of the inner tube 28 prevents a substantial tangential component 74 of shaft displacement from occurring. As the unitary shaft rider 34 moves upwardly, it forces the accelerometer protecting housing 38 which is also considered as a force transmitting portion between the shaft rider 34 and the coil spring 42 against the bottom portion of the coil spring 40 thus compressing the spring 42 against the retaining ring 40. The accelerometer 36 is thus free to vibrate in a one to one correspondence with the vibration of the rotating shaft 20 as indicated by the arrow 72. This vibratory signal is passed or transmitted as electronic impulses or signals along the coaxial line 48 to the upper portion 12 of the vibration monitoring device 10, specifically to the electronics module 52 where in a preferred embodiment a single integration of the signal is accomplished. The once integrated signal then is passed along line 55 to the electronics module 22 where another integration of the signal may take place which signal is then provided to the readout module 24 in the form of a displacement signal to be put to some useful purpose. In other embodiments of the invention, the electronics module 52 may accomplish double integration of the signal provided from transducer 36 along lines 48 or it may provide no integration leaving the integration to the electronic signal conditioning module 22.

Because of the shaft rider 34 is relatively light compared with prior art shaft riders due to its reduced length compared to prior art shaft riders, the shaft rider is less likely to move away from the surface of the rotating shaft 20 during a high vibrating condition and thus tracks more truely. This is enhanced by the presence of the coil spring 42 which forces the shaft rider against the rotating shaft 20. The unitary shaft rider may be comprised of any suitable material, such as babbit, copper or bronze and in a preferred embodiment of the invention a polyimide material such as that which is sold under the trademark "VESPEL." A light weight material such as that sold under the trademark TEFLON may also comprise the material for the unitary shaft rider 34. The latter two mentioned materials are especially suitable for use in the present invention because of their light weight compared to the others. The invention has been used experimentally and has been found capable of measuring shaft vibration down to 10 hertz while tracking G forces of approximately 50 G's or 50 times the force of gravity in a true tracking mode and even higher G forces with a high recovery rate to a true tracking mode. The accelerometer employs a piezoelectric material and in the preferred embodiment of the invention, a piezoelectric crystal is used. In the experiments, it was found that the wear of the material used in the preferred embodiment of the invention was less than either bronze or babbit based on induced wear against $32 \times 10^{-6}$ inches of metal finish. The accelerometer may be fastened to the shaft rider by epoxy binder. In the preferred embodiment of the invention, a specific epoxy resin such as that sold under the trademark HYSOL RESIN C9—4183 with hardener H2—3561 and cured at room temperature was used for bonding the accelerometer to the shaft rider. During experiments it was found that the linearity of the vibration was better than 1% full scale. It was also found that the shaft rider could be oriented as shown in the Figure in the vertical position or in the horizontal position or any position in between and the orientation had no measurable effect on the calibration. It was also found that the outside of the shaft rider could be heated slowly to 200°F or exposed to a strong thermal transient of a 500°F blast of air from a heat gun without producing a measurable disturbance on the system's output or the output measured or shown at readout module 24.

It is to be understood that the previously described facts and data are exemplary of a preferred embodiment and that variations from these figures and materials could be made without substantially changing the characteristics of the vibration monitoring device. It is also to be understood that although the shaft 20 is shown in the Figure to be rotating in the clockwise direction 68 it can rotate in a counterclockwise direction without affecting the operation of the vibration monitoring device.

The invention embodied in the teachings of this application has many advantages. One of the advantages is the fact that the relative small size and weight of the rider coupled with the use of an axially disposed coil spring as a forcing member allows the rider to truely track vibration over a wide range even at a high magnitude of vibration. Another advantage lies in the fact that since it is difficult to cause transverse movement with respect to the axis of the vibration, the resulting signal is a truer indication of the true amount of vibration in the shaft 20. Another advantage lies in the fact that no leaf springs are required which may cause tangential components of movement of the unitary rider during vibration measurement. Another advantage lies in the fact that since the accelerometer is by nature an absolute vibration measuring device no siesmic springs are required which are sensitive to temperature, sag and distortion. Another advantage lies in the fact that since the vibration monitor does measure vibration with respect to an inertial frame, the presence of any forcing function which may cause vibration in the shaft will be picked up and detected by the vibration monitor. This is advantageous because all vibration is capable of destroying a rotating shaft and the equipment in which it is placed and it is relatively irrelevant from which source the vibration comes and it is desirable therefore to know all the components causing vibration in a rotating shaft so that those which may be located outside of the equipment in which the rotating shaft is located may be eliminated or reduced.

Another advantage lies in the fact that since a crystal accelerometer is used here, it can withstand a G force of hundreds of G's. Another advantage lies in the fact that since the accelerometer is placed strategically between the rider and that portion of the protective housing which abuts the coil spring, the accelerometer is disposed in a location least affected by transverse movement of the face of the unitary rider and thus has less tendency to show transverse vibration from that transverse movement.

Another advantage lies in the fact that since the accelerometer is embedded deep in the bearing within the protective inner and outer housings close to the unitary rider it is less likely to be destroyed by or affected by phenomena on the outer surface of the bearing cap such as inadvertent knocking about and uncontrolled environmental conditions, as the environment within the deepest part of the bearing where the accelerometer is typically located is less susceptible to change.

What I claim is:

1. A vibration monitoring device for monitoring the radial vibratory motion of a rotating shaft in an apparatus relative to an inertial frame of reference, where the rotating surface of the shaft is radially spaced from the surface of the apparatus in a plane generally transverse to the axis of the shaft by a distance which is relatively large when compared with the diameter of the shaft, where a communicating channel of relatively small cross-section when compared with the diameter of the shaft is present between the apparatus surface and the shaft surface for thereby providing access to the shaft surface from the apparatus surface for monitoring the vibratory motion of the shaft, comprising:

indicating means disposed outside of said channel;
an absolute vibration measuring transducer disposed in said channel and electrically connected to said indicating means for converting mechanical movement which is provided to said transducer into an electrical signal which signal is provided to said indicating means to give an indication of the magnitude of said mechanical movement; and
a unitary shaft rider disposed in said channel but not affixed thereto comprising a generally homogeneous structural material, one portion of which is disposed in physical contact with said transducer and generally is the only means of support for said transducer and another portion which is generally disposed against said shaft for the purpose of transmitting a portion of the mechanical vibratory movement of said shaft relative to said inertial frame of reference at any instant of time to said transducer, said entire transducer being generally only radially movable relative to said shaft in said channel during coversion of said mechanical motion to said electrical signal.

2. The combination as claimed in claim 1 wherein said shaft rider has an axis generally transverse to the tangent of the outer surface of said shaft at that portion of said shaft where said rider is tracking at any instant of time, a shaft rider guide means disposed in said channel, said guide means allowing said shaft rider to move generally unimpeded in the direction of said axis in response to said vibratory motion in said shaft but generally impeding rotary movement of said rider about said rider axis.

3. A vibration monitoring device for monitoring the radial vibratory motion of a rotating shaft in an apparatus relative to an inertial frame of reference, where the rotating surface of the shaft is radially spaced from a surface of the apparatus in a plane generally transverse to the axis of the shaft by a distance which is relatively large when compared with the diameter of the shaft, where a communicating channel of small cross-section when compared with the diameter of the shaft is present between the apparatus surface and the shaft surface for thereby providing access to the shaft surface from the apparatus surface for monitoring the vibratory motion of the shaft, comprising:

indicating means disposed outside of said channel;
an absolute vibration measuring transducer disposed in said channel and electrically connected to said indicating means for converting mechanical movement which is provided to said transducer into an electrical signal which signal is provided to said indicating means to give an indication of the magnitude of said mechanical movement;
a shaft rider member disposed in said channel but not affixed thereto one portion of which is disposed in physical contact with said transducer and generally is the only means of support for said transducer and another portion of which is generally disposed against said shaft for the purpose of transmitting a portion of the mechanical vibratory movement of said shaft relative to said inertial frame of reference at any instant of time to said transducer, said entire transducer being generally only radially movable relative to said shaft in said channel during conversion of said mechanical motion to said electrical signal; and
coil spring means, one portion of which is held generally fixed relative to said apparatus surface and another portion of which is disposed against said transducer to provide a force of spring compression to thereby cause said shaft rider member which is in physical contact with said transducer to generally track said rotating shaft.

4. The combination as claimed in claim 3 wherein said shaft rider has an axis generally transverse to the tangent of the outer surface of said shaft at that portion of said shaft where said rider is tracking at any instant of time, shaft rider guide means disposed in said channel, said guide means allowing said shaft rider to move generally unimpeded in the direction of said axis in response to said vibratory motion in said shaft but generally impeding rotary movement of said rider about said rider axis.

5. The combination as claimed in claim 4 wherein said shaft rider member comprises generally homogeneous structural material.

6. The combination as claimed in claim 5 wherein said guide means comprises a cylindrical tube, said cylindrical tube having disposed therein at least a portion of said coil spring means, at least a portion of said transducer and at least a portion of said shaft rider for protecting and guiding said last three mentioned elements.

7. A vibration monitoring device for monitoring the radial vibratory motion of a rotating shaft in an apparatus relative to an inertial frame of reference, where the rotating surface of the shaft is radially spaced from a surface of the apparatus in a plane generally transverse to the axis of the shaft by a distance which is relatively large when compared with the diameter of the shaft, where a communicating channel of relatively small cross-section when compared with the diameter of the shaft is present between the apparatus surface and the shaft surface for thereby providing access to the shaft surface from the apparatus surface for monitoring the vibratory motion of the shaft, comprising:
   indicating means disposed outside of said channel;
   an absolute vibration measuring transducer disposed in said channel and electrically connected to said indicating means for converting mechanical movement which is provided to said transducer into an electrical signal which signal is provided to said indicating means to give an indication of the magnitude of said mechanical movement;
   a shaft rider member disposed in said channel but not affixed thereto, one portion of which is disposed in physical contact with said transducer and generally is the only means of support for said transducer and another portion of which is disposed against said shaft for the purpose of transmitting a portion of the mechanical vibratory movement of said shaft relative to said inertial frame of reference at any instant of time to said transducer, said shaft rider having an axis generally transverse to the tangent of the outer surface of said shaft at that portion of said shaft where said shaft rider is tracking at any instant of time, said entire transducer being generally only radially movable relative to said shaft in said channel during conversion of said mechanical motion to said electrical signal; and
   shaft rider guide means disposed in said channel, said guide means allowing said shaft rider to move generally unimpeded in the direction of said axis in response to said mechanical vibratory movement in said shaft but generally impeding rotary movement of said rider about said rider axis.

8. A vibration monitoring device for monitoring the radial vibratory motion of a rotating shaft in an apparatus relative to an inertial frame of reference, where the rotating surface of the shaft is radially spaced from a surface of the apparatus in a plane generally transverse to the axis of the shaft by a distance which is relatively large when compared with the diameter of the shaft where a communicating channel of relatively small cross-section when compared with the diameter of the shaft is present between the apparatus surface and the shaft surface for thereby providing access to the shaft surface from the apparatus surface for monitoring the vibratory motion of the shaft, comprising:
   indicating means disposed outside of said channel;
   an absolute vibration measuring transducer disposed in said channel and electrically connected to said indicating means for converting mechanical movement which is provided to said transducer into an electrical signal which signal is provided to said indicating means to give an indication of the magnitude of said mechanical movement;
   a shaft rider disposed in said channel but not affixed thereto, one portion of which is disposed in physical contact with said transducer and generally is the only means of support for said transducer and another portion of which is disposed against said shaft for transmitting a portion of the mechanical movement of said shaft relative to said inertial frame of reference at any instant of time to said transducer, said entire transducer being generally only radially movable relative to said shaft in said channel during conversion; of said mechanical motion to said electrical signal; and
   spring means affixed at one end thereof to said channel and at another end thereof to said shaft rider for tracking said shaft rider on said shaft.

9. The combination as claimed in claim 8 comprising a protective housing for said transducer, said spring means comprising a coil spring disposed against said protective housing.

10. A vibration monitoring device for monitoring the radial vibratory motion of a rotating shaft in an apparatus, where the rotating surface of the shaft is radially spaced from a surface of the apparatus in a plane generally transverse to the axis of the shaft by a distance which is relatively large when compared with the diameter of the shaft, where a communicating channel of relatively small cross-section when compared with the diameter of the shaft is present between the apparatus surface and the shaft surface for thereby providing access to the shaft surface from the apparatus surface for monitoring the vibratory motion of the shaft, comprising:
   indicating means disposed outside of said channel;
   a transducer disposed in said channel and electrically connected to said indicating means for converting mechanical movement provided to said transducer into an electrical signal which signal is provided to said indicating means to give an indication of the magnitude of said mechanical movement;
   a shaft rider member disposed; in said channel but not affixed thereto comprised of generally homogeneous structural material, one portion of which is disposed in physical contact with said transducer and generally is the only means of support for said transducer and another portion of which is generally disposed against said shaft for the purpose of transmitting said mechanical vibratory movement of said shaft at any instant of time to said transducer, said entire transducer being generally only radially movable relative to said shaft in said channel during conversion of said mechanical motion to said electrical signal, said shaft rider having an axis generally transverse to the tangent of the outer surface of said shaft at that portion of said shaft where said rider is tracking at any instant of time;

coil spring means, one portion of which is held generally fixed relative to said apparatus surface and another portion of which is disposed against said transducer to provide a force of spring compression to thereby cause said shaft rider member which is in physical contact with said transducer to generally track said rotating shaft; and a cylindrical tubular shaft rider guide means disposed in said channel, said guide means allowing said shaft rider to move generally unimpeded in the direction of said axis in response to said mechanical movement in said shaft but generally impeding movement of said rider in a direction transverse to said axis, said guide means communicating with the surface of said shaft, said guide means having disposed therein at least a portion of said coil spring means, at least a portion of said transducer and at least a portion of said shaft rider for protecting said last three mentioned elements, said guide means having disposed therein a recess, said rider having disposed thereon a protrusion a portion of which is disposed in said recess, said recess being oriented to cooperate with said protrusion to allow said rider to move substantially unimpeded in the direction of said axis but not to allow said rider to rotate substantially about said axis.

11. A vibration monitoring device for monitoring the radial vibratory motion of a rotating shaft in a bearing mount, where the rotating surface of the shaft is radially spaced from a surface of the bearing mount in a plane generally transverse to the axis of the shaft by a distance which is relatively large when compared with the diameter of the shaft, where a communicating channel of relatively small cross-section when compared with the diameter of the shaft is present between the bearing mount surface and the shaft surface for thereby providing access to the shaft surface from the bearing mount surface for monitoring the vibratory motion of the shaft comprising:

indicating means disposed outside of said channel;

an accelerometer disposed in said channel and electrically connected to said indicating means for converting mechanical movement provided to said accelerometer into an electrical signal which signal is provided to said indicating means to give an indication of the magnitude of said mechanical movement;

a shaft rider disposed in said channel but not affixed thereto comprising an integral protective housing at the upper portion thereof for enclosing said accelerometer, said shaft rider being disposed adjacent to said shaft for transmitting a portion of the mechanical movement of said shaft at any instant of time to said accelerometer; and a coil spring disposed in compressible relationship between said channel wall and said integral protective housing of said shaft rider to bias said shaft rider against said shaft.

* * * * *